US008843779B1

(12) United States Patent
Kuan et al.

(10) Patent No.: US 8,843,779 B1
(45) Date of Patent: Sep. 23, 2014

(54) DISK DRIVE BACKUP PROTECTION USING A SIGNATURE WITH AN ENHANCED FILE MANAGER

(75) Inventors: Chin Phan Kuan, Seri Kembangan (MY); Noppol Vangnayunut, Bangkok (TH); Nikki Poh Ling Khew, Klang (MY); Peng Lee Liang, Subang Jaya (MY)

(73) Assignee: Western Digital Technologies, Inc., Irvine, CA (US)

(*) Notice: Subject to any disclaimer, the term of this patent is extended or adjusted under 35 U.S.C. 154(b) by 122 days.

(21) Appl. No.: 13/612,743

(22) Filed: Sep. 12, 2012

(51) Int. Cl.
G06F 11/00 (2006.01)
G06F 11/16 (2006.01)

(52) U.S. Cl.
USPC ............................................ 714/4.11; 714/54

(58) Field of Classification Search
USPC ............................................ 714/4.11, 42, 54
See application file for complete search history.

(56) References Cited

U.S. PATENT DOCUMENTS

| 5,987,569 | A * | 11/1999 | Takahashi et al. ............ 711/119 |
| 6,430,663 | B1 | 8/2002 | Ding |
| 6,437,937 | B1 * | 8/2002 | Guo et al. ............ 360/78.05 |
| 6,711,660 | B1 | 3/2004 | Milne et al. |
| 6,978,345 | B2 * | 12/2005 | Tomaszewski et al. ....... 711/112 |
| 7,191,286 | B2 | 3/2007 | Forrer, Jr. et al. |
| 7,752,491 | B1 * | 7/2010 | Liikanen et al. ............. 714/6.13 |
| 7,899,998 | B1 * | 3/2011 | Katzer et al. ................. 711/151 |
| 8,250,313 | B1 * | 8/2012 | Katzer et al. ................. 711/151 |
| 2002/0194420 | A1 * | 12/2002 | Tomita ............................ 711/1 |
| 2004/0044890 | A1 | 3/2004 | Lim et al. |
| 2008/0180826 | A1 * | 7/2008 | Cho ............................ 360/48 |
| 2009/0164742 | A1 * | 6/2009 | Wach et al. .................... 711/162 |

FOREIGN PATENT DOCUMENTS

JP 2008016051 A * 1/2008

* cited by examiner

Primary Examiner — Scott Baderman
Assistant Examiner — Paul Contino

(57) ABSTRACT

A disk drive including a disk surface including a first backup location, and a second backup location, a head actuated radially over the disk surface to write data to the disk surface, a memory configured to store a signature, and control circuitry coupled to the head. The control circuitry can be configured to receive a command to write data to the disk surface, insert the signature into the data, write the data to the disk surface, and alternately writing a spare copy of the data to the first backup location and to the second backup location based on a value of the signature.

17 Claims, 21 Drawing Sheets

| Running Number | Working Location | 1st Backup Location | 2nd Backup Location |
|---|---|---|---|
| 1 | 1 | 1 | |
| 2 | 2 | | 2 |
| 3 | 3 | 3 | |
| 4 | 4 | | 4 |
| ... | ... | ... | ... |
| ...... | ...... | ...... | ...... |
| 1000 | 1000 | | 1000 |
| 1 | 1 | 1 | |
| 2 | 2 | | 2 |

FIG. 8

| File ID | Running Number | Retry Count | Mark_Bad_Bit | | |
|---|---|---|---|---|---|
| | | | Working Location | 1st Backup Location | 2nd Backup Location |
| File 0x01 | | | | | |
| File 0x02 | | | | | |
| File 0x03 | | | | | |
| ... | | | | | |
| ...... | | | | | |
| ........ | | | | | |

FIG. 9

| File ID | Running Number | Retry Count | Mark_Bad_Bit | | |
|---|---|---|---|---|---|
| | | | Working Location | 1st Backup Location | 2nd Backup Location |
| File 0x03 | 7 | | 1 | | |

FIG. 10

| Running Number | Set 1 | Set 2 |
|---|---|---|
| 1 | 1 | |
| 2 | | 2 |
| 3 | 3 | |
| 4 | | 4 |
| ... | ... | ... |
| ...... | ...... | ...... |
| 1000 | | 1000 |
| 1 | 1 | |
| 2 | | 2 |

FIG. 17

| File ID | Running Number | Retry Count | Mark_Bad_Bit | | | |
|---|---|---|---|---|---|---|
| | | | 1st Working Location | 1st Backup Location | 2nd Working Location | 2nd Backup Location |
| File 0x01 | | | | | | |
| File 0x02 | | | | | | |
| File 0x03 | | | | | | |
| ... | | | | | | |
| ..... | | | | | | |
| ........ | | | | | | |

FIG. 18

| File ID | Running Number | Retry Count | Mark_Bad_Bit | | | |
|---|---|---|---|---|---|---|
| | | | 1st Working Location | 1st Backup Location | 2nd Working Location | 2nd Backup Location |
| File 0x03 | | 7 | 1 | | | |

DISK DRIVE BACKUP PROTECTION USING A SIGNATURE WITH AN ENHANCED FILE MANAGER

BACKGROUND

A disk drive can include a disk upon which data can be stored. The disk drive may store certain critical data on the disk, which may be used for an operation of the disk drive. The critical data may be kept in a reserved area on the disk.

However, due to dynamic random-access memory ("DRAM") corruption, disk drive defects, shock or vibration events, power surges, power cuts, or other events, the critical data may become corrupted. Thus, a spare copy of the critical data may be used and stored in a separate location. However, the spare copy of the critical data may also become corrupted at the same time as the critical data.

For example, when the critical data becomes corrupted and the disk drive enters a hang state, a write buffer could become corrupted. Thus, the spare copy of the critical data may be overwritten with a copy of the corrupted critical data. In such a case, all valid versions of the critical data may be lost. In some instances this could cause a disk failure in the disk drive. If the critical data was being used on power up, the disk drive could also enter an irrecoverable stage.

BRIEF DESCRIPTION OF THE DRAWINGS

The features and advantages of the present embodiments will become more apparent from the detailed description set forth below when taken in conjunction with the drawings, wherein:

FIG. 8 depicts a running number table according to an embodiment;

FIG. 9 depicts an electronic file management table according to an embodiment;

FIG. 10 depicts a portion of an electronic file management table according to an embodiment;

FIG. 17 depicts a running number table according to an embodiment;

FIG. 18 depicts an electronic file management table according to an embodiment;

FIG. 19 depicts a portion of an electronic file management table according to an embodiment;

DETAILED DESCRIPTION

Overview

Figure 1:
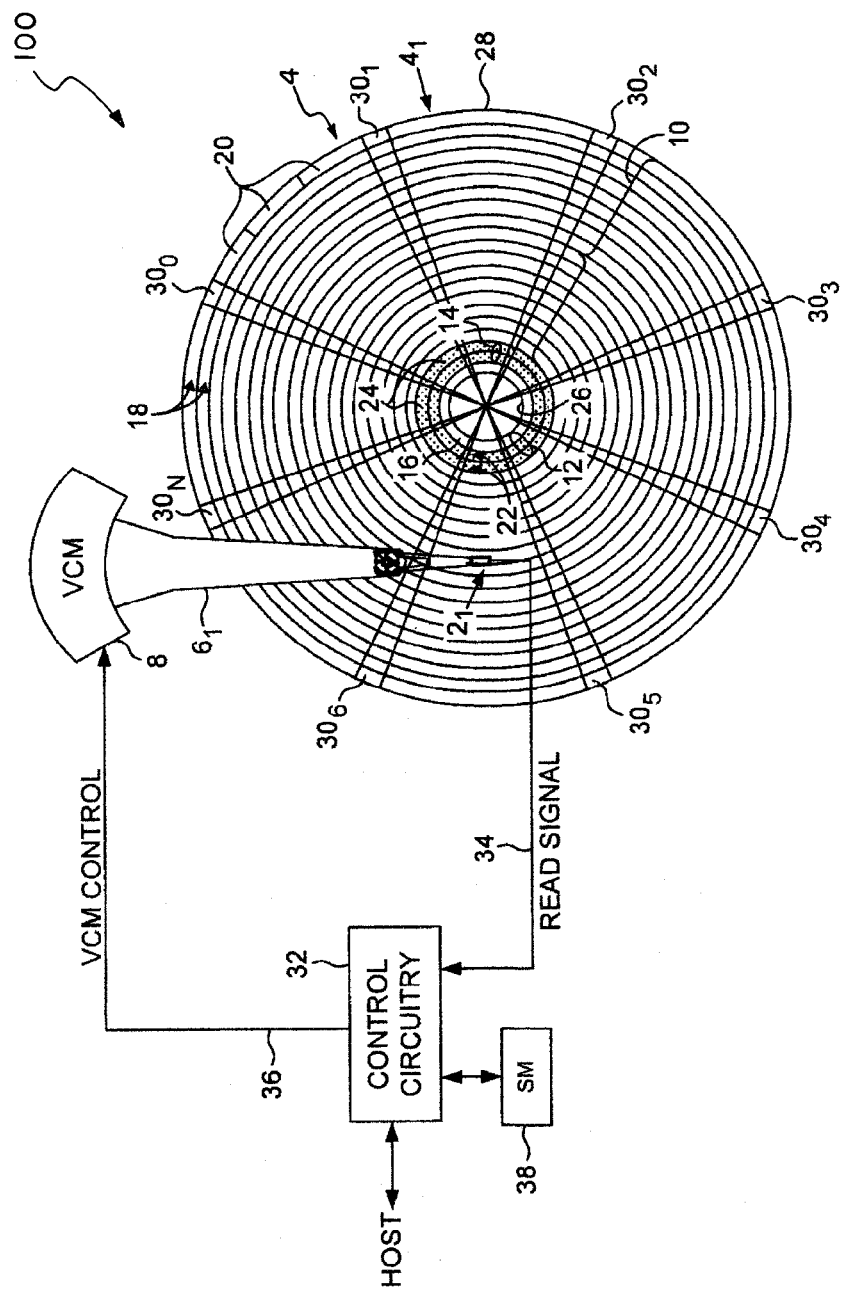
FIG. 1 is a disk drive according to an embodiment.

FIG. 1 shows a disk drive 100 according to an embodiment comprising a head $2_1$ actuated radially over a disk surface 4 such as a disk surface $4_1$ by an actuator arm $6_1$, and a voice coil motor (VCM) 8 operable to rotate the actuator arm $6_1$ about a pivot. The disk drive may be connected to a host computing device ("host") whereby the host stores data to and retrieves data from the disk drive. The disk surface $4_1$ comprises a host addressable area 10 and a spare area 12, which comprises a non-host addressable region 14 and a reallocation region 16. The host addressable area 10 comprises a plurality of data tracks 18, wherein each data track 18 comprises a plurality of data blocks 20. The plurality of data blocks 20 in host addressable area 10 can be addressed and used by the host for reading and writing data. The non-host addressable region 14 comprises a plurality of data tracks 22, wherein each data track 22 comprises a plurality of data blocks 24. In an embodiment, the plurality of data blocks 24 in non-host addressable region 14 are not addressable by the host (i.e., hidden from the host), but are used by the disk drive 100 for storing spare copies of data blocks 24 in the host addressable area 10. Reallocation region 16 is reserved for relocation of defective data blocks in the host addressable area 10 of the disk surface $4_1$. In other embodiments, the plurality of data blocks 24 may be at other locations and not near the reallocation region 16.

In one embodiment, the non-host addressable region 14 is created in a portion of the spare area 12 of the disk surface $4_1$. For example, the non-host addressable region 14 may be created by forming a partition in the spare area 12. In the embodiment of FIG. 1, the non-host addressable region 14 is located near an inner diameter 26 of the disk surface $4_1$. However, the non-host addressable region 14 may be located at any suitable location on the disk surface $4_1$, such as near an outer diameter 28 of the disk surface $4_1$, or anywhere between the inner diameter 26 and the outer diameter 28 of the disk surface $4_1$. In one embodiment, non-host addressable region 14 is created to have a sufficient storage capacity to store a predetermined range of data blocks. In an embodiment, the non-host addressable region 14 further comprises a table for tracking the existence and location of the spare copies that are stored in the non-host addressable region 14. The table can also include an entry to indicate whether each spare copy is valid or invalid, for example.

In the embodiment in FIG. 1, the disk surface $4_1$ further comprises a plurality of embedded servo sectors $30_1$-$30_N$ that define the data tracks 18 in the host addressable area 10 and the data tracks 22 in the non-host addressable region 14. The disk drive 100 further comprises control circuitry 32, which is operable to process a read signal 34 emanating from the head $2_1$ to demodulate the embedded servo sectors $30_1$-$30_N$ and generate a position error signal (PES). The PES represents a radial offset of the head $2_1$ from a target data track 18 in the host addressable area 10 or a target data track 22 in the non-host addressable region 14. The control circuitry 32 is further operable to process the PES with a suitable servo compensator to generate a VCM control signal 36 applied to the VCM 8. The VCM 8 rotates the actuator arm $6_1$ about a pivot in order to actuate the head $2_1$ radially over the disk surface $4_1$ in a direction that decreases the PES.

The disk drive 100 further comprises a semiconductor memory (SM) 38 communicatively coupled to the control circuitry 32. The SM 38 can comprise, for example, dynamic random access memory (DRAM), Flash memory, or static random access memory (SRAM). In an embodiment, the SM 38 further comprises a cache for temporarily storing write data received from the host via a write command and read data requested by the host via a read command.

Figure 2:
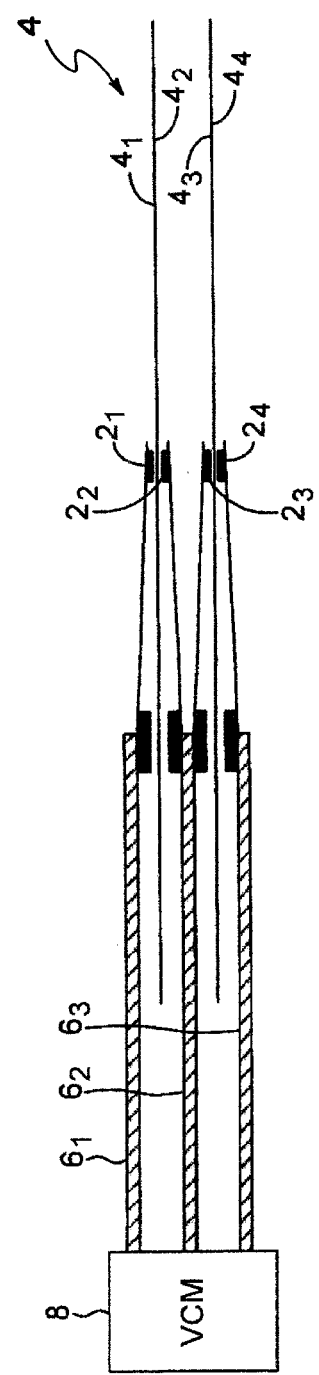
FIG. 2 depicts heads actuated over disk surfaces by a voice coil motor and actuator arms according to an embodiment.

In an embodiment shown in FIG. 2, a plurality of heads $2_1$-$2_4$ are actuated over respective disk surfaces $4_1$-$4_4$ by a VCM 8 which rotates actuator arms $6_1$-$6_3$ about a pivot. In one embodiment, each of disk surfaces $4_1$-$4_4$ comprises a host addressable area 10 comprising a plurality of data tracks 18 and a spare area 12 comprising a non-host addressable region 14. Each of the non-host addressable regions 14 comprise a plurality of data tracks 22 each comprising a plurality of data blocks 24, which are not addressable by the host. In an embodiment, the plurality of data blocks 24 are used for storing spare copies of data stored in the host addressable area 10. Alternatively, the non-host addressable area comprising a plurality of data blocks 24 may be located on one or more of the disk surfaces $4_1$-$4_4$.

In an embodiment, the disk surface 4 includes a first working location, a second working location different than the first working location, a first backup location, and a second backup location different than the first backup location. In an embodiment, the first working location, the second working location, the first backup location, and/or the second backup location is located in the non-host addressable region 14.

Flow

Figure 3:
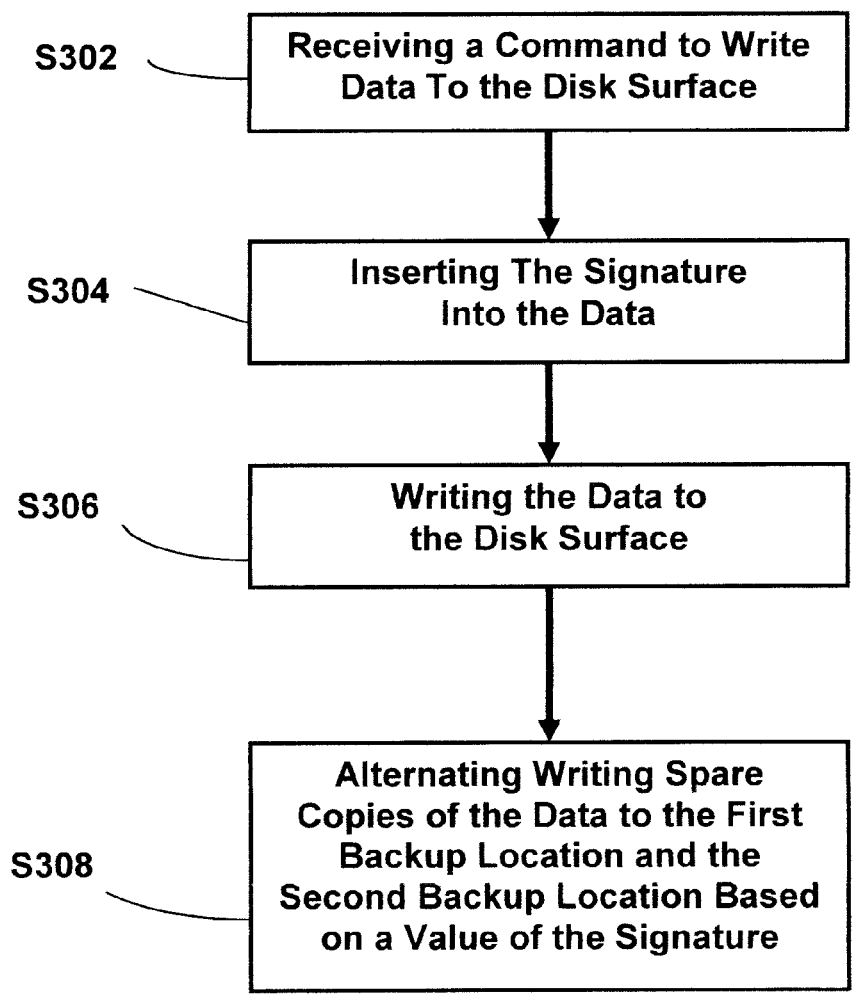
FIG. 3 depicts a flow chart according to an embodiment.

FIG. 3 is a flow diagram executed by the control circuitry 32 according to an embodiment, wherein the control circuitry 32 includes or is an enhanced file manager. In Block S302, the control circuitry 32 receives a command to write data to the disk surface 4. In an embodiment, the command can be received, for example, internally from the disk drive 100, or a host. Furthermore, in an embodiment, the data can be, for example, critical data such as files used to store the extended firmware code, files used for drive configuration or power up parameters, or files used for debugging or logging purposes.

Figure 4:
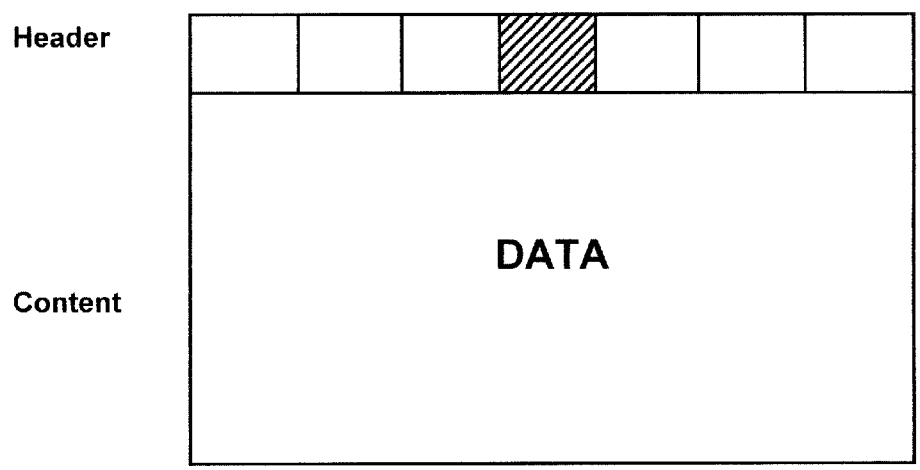
FIG. 4 depicts data including a signature according to an embodiment.

In Block S304, the control circuitry 32 inserts a signature into the data. In an embodiment, as seen in FIG. 4, the data can include a header and a content. For example, the control circuitry 32 can insert the signature into the header of the data. In an embodiment, as shown in FIG. 4, the signature is a running number, which will be explained in more detail below.

Figure 5:
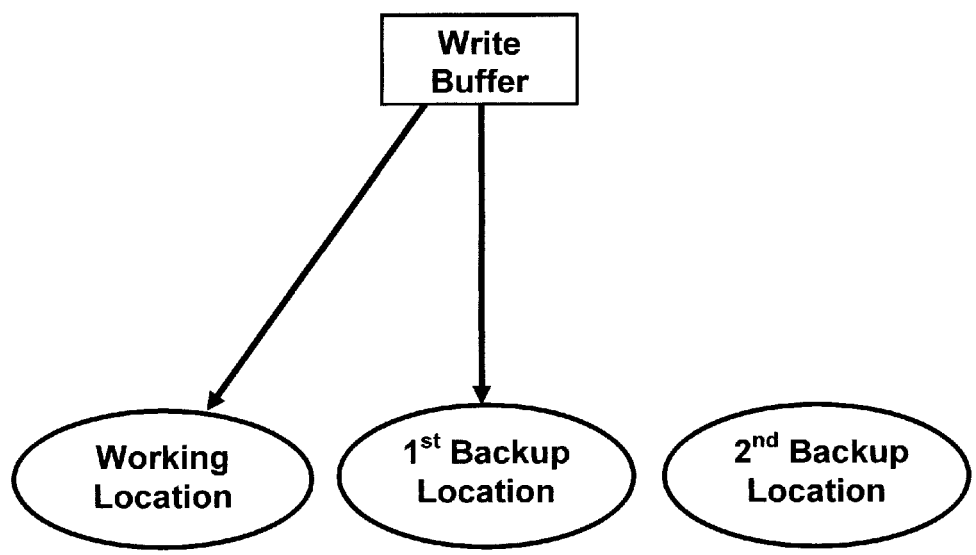
FIG. 5 depicts data being written to a working location and a spare copy of the data being written to a first backup location according to an embodiment.
Figure 6:
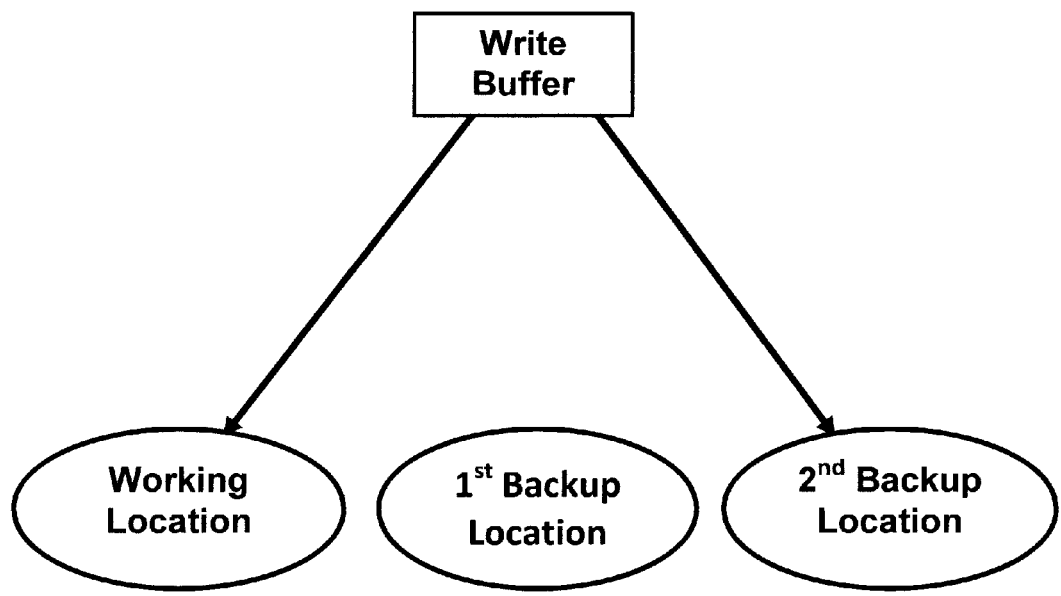
FIG. 6 depicts data being written to a working location and a spare copy of the data being written to a second backup location according to an embodiment.

In Block S306, the control circuitry 32 writes the data to the disk surface 4. For example, as seen in FIGS. 5 and 6, the control circuitry 32 can write data from a write buffer to a working location on the disk surface 4. In an embodiment, the working location is the first working location or the second working location. In an embodiment, the write buffer is located in the SM 38.

In Block S308, the control circuitry 32 alternates writing spare copies of the data to the first backup location and the second backup location based on a value of the signature as seen in FIGS. 5 and 6. As previously noted, the signature can be, for example, the running count. In an embodiment, when the running number is an odd number, the control circuitry 32 writes a spare copy of the data to the first backup location as seen in an embodiment shown in FIG. 5. However, when the running number is an even number, the control circuitry 32 writes a spare copy of the data to the second backup location as seen in an embodiment shown in FIG. 6.

In an embodiment, the writing of the spare copies of the data to the first backup location and the second backup location can also be flipped. In such a case, the control circuitry 32 writes a spare copy of the data to the first backup location when the running number is an even number, and writes a spare copy of the data to the second backup location when the running number is an odd number.

Figure 7:
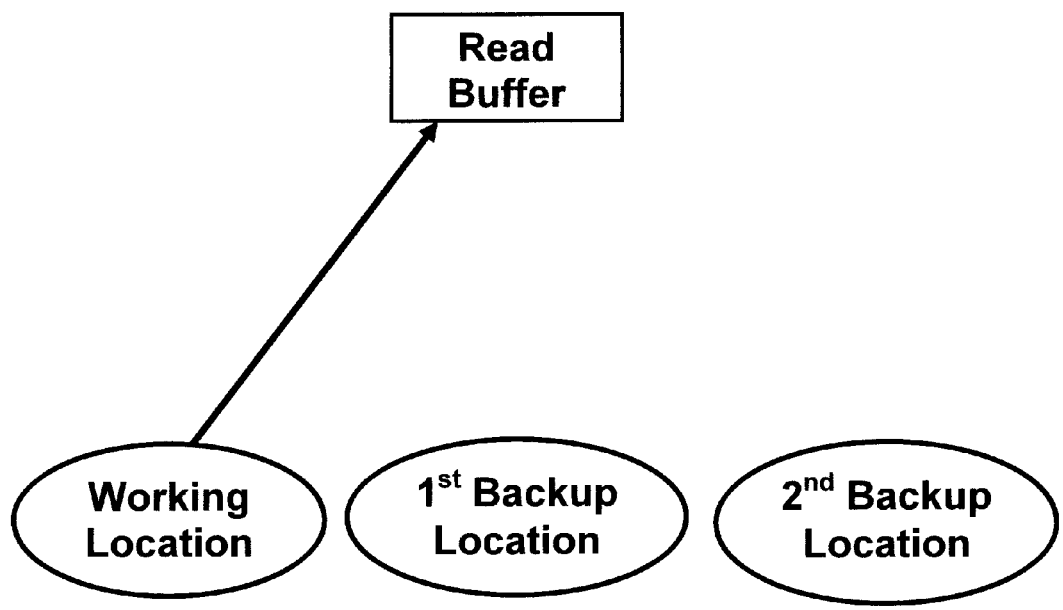
FIG. 7 depicts a verify operation being performed on the data written to the working location according to an embodiment.

In an embodiment, as seen in FIG. 7, the control circuitry 32 verifies the data written to the disk surface 4 in the working location through a read operation from a read buffer. In an embodiment, the read buffer is located in the SM 38. If the data is verified as being correct, then the control circuitry 32 increments the running number by 1. As the running number is incremented, the running number alternates between an odd number and an even number. Since the running number alternates between an odd number and an even number, the control circuitry 32 alternates writing spare copies of the data to the first backup location and the second backup location as shown in an embodiment in FIG. 8.

In an embodiment, if the control circuitry 32 is unable to verify the data stored in the working location as being correct, the control circuitry 32 will not increment the running number. This effectively halts the alternate writing of the spare copies of the data to the first backup location and the second backup location until the data in the working location can be verified. Since spare copies of the data are no longer being alternately written to two different locations, only a single location will be used for the storage of the spare copies of the data until the data in the working location is verified as being correct. This ensures that at least one of the backup locations will contain a valid, non-corrupt, or error-free data.

An embodiment shown in FIG. 8 depicts a running number table including the running number, the running number of the data stored in the working location, the running number of the spare copy of the data stored in the first backup location, and the running number of the spare copy of the data stored in the second backup location. The running number in the working location corresponds with the current running number. However, the running number of the spare copy of the data stored in the first backup location corresponds only with odd running numbers, while the running number of the spare copy of the data stored in the second backup location corresponds only with even running numbers.

Although not shown in FIG. 8, in an embodiment, the running number of the spare copy of the data stored in the first backup location corresponds only with even running numbers instead of odd running numbers, and the running number of the spare copy of the data stored in the second backup location corresponds only with odd running numbers instead of even running numbers.

As seen in FIG. 8, the control circuitry 32 increments the running number until the running number reaches a predetermined maximum running number. Once the predetermined maximum running number is reached, the control circuitry 32 resets the running number. Although the predetermined maximum running number in FIG. 8 is 1000, the predetermined maximum running number can be set to any number sufficiently large enough to allow the control circuitry 32 to accurately determine where the most recent spare copy of the data is written or should be written.

Electronic File Management Table

In an embodiment, as shown in FIG. 9, an electronic file management table is stored in a memory in the disk drive 100. For example, the electronic file management table may be stored in the SM 38. Optionally, the electronic file management table may also be stored on the disk surface 4. In an embodiment, the electronic file management table can be used by the control circuitry 32 for recovery purposes.

As seen in FIG. 9, the electronic file management table can include, for an individual file being tracked, for example, a file ID section, a running number section, a retry count section, and a Mark_Bad_Bit section. The file ID section indicates the associated file corresponding to the data to be written to the disk surface 4. The running number section indicates the current running number associated with the data. The retry count section indicates the number of times writing the data in the file to the disk surface has been retried. The Mark_Bad_Bit section indicates whether the working copy of the data stored in the working location, the spare copy of the data stored in the first backup section, or the spare copy of the data stored in the second backup section contains errors. In an embodiment, the errors are one or more errors which indicate that incorrect data has been written to the disk surface 4, that the data is unreadable, or that the data is corrupt.

Figure 11:
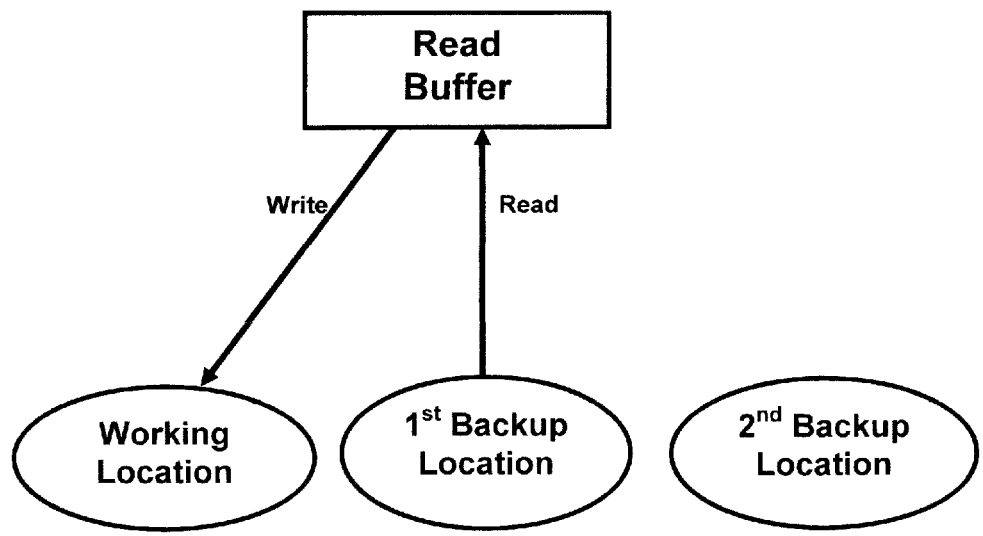
FIG. 11 depicts a replacement of data in a working location with a spare copy of the data in a first backup location according to an embodiment.

For example, in an embodiment shown in FIG. 10, the file 0x03 (which may be a file storing data needed for drive operation) can have a running number of "7." Since "7" is an odd number, the control circuitry 32 will store a spare copy of the data in the first backup location. Furthermore, as seen in the Mark_Bad_Bit section, the data stored in the working location has a "1" in its column, indicating that the data stored in the working location contains errors. Thus, as seen in an embodiment shown in FIG. 11, the control circuitry 32 attempts to read the spare copy of the data stored in the first backup location and overwrite the corrupt data stored in the working location. Therefore, the data stored in the working location is replaced by the spare copy of the data from the first backup location since the running number is an odd number. In an embodiment, an additional verification can be performed on the data stored in the first working location, after it has been replaced by the spare copy of the data from the first backup location.

However, if the spare copy of the data stored in the first backup location is corrupt, or the data stored in the working location still contains errors even though the data stored in the working location was overwritten by the spare copy of the data stored in the first backup location, the control circuitry 32 can utilize the spare copy of the data stored in the second backup location. Thus, the control circuitry 32 will replace the data stored in the working location with the spare copy of the data stored in the second backup location.

Protection of a Spare Copy of the Data

Figure 12:
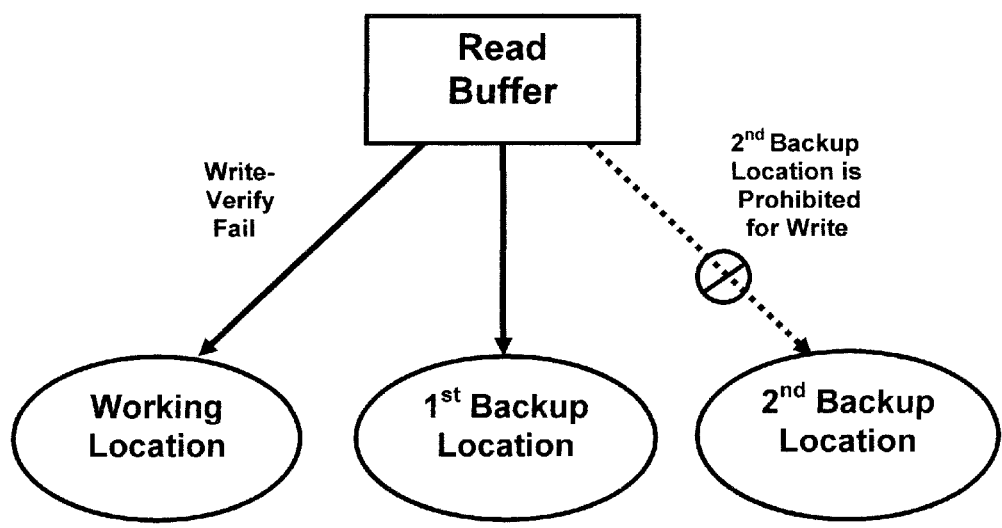
FIG. 12 depicts a second backup location being set to a read-only status according to an embodiment.

In an embodiment as shown in FIG. 12, the control circuitry 32 sets the second backup location to a read only status when the running number is an odd number, and the data stored in the working location or the spare copy of the data stored in the first working location contains errors. The second backup location is thus prohibited from being written as shown by the dotted line in FIG. 12. This prevents the second backup location from being overwritten by corrupt data before the working copy of the data, which has been replaced by the spare copy of the data from the first backup location, is verified. In an embodiment, the running number does not need to be odd in order for the control circuitry 32 to set the second backup location to a read only status. Instead, the control circuitry 32 need only determine that the data stored in the working location or the spare copy of the data stored in the first working location contains errors. In an embodiment, this can ensure that there is at least one non-corrupt or error-free version of the data.

Similarly, the control circuitry 32 sets the first backup location to a read only status when the running number is an even number and the data stored in the working location or the spare copy of the data stored in the second working location contains errors. In an embodiment, the running number does not need to be even in order for the control circuitry 32 to set the first backup location to a read only status. Instead, the control circuitry 32 need only determine that the data stored in the working location or the spare copy of the data stored in the second working location contains errors.

Alternate Embodiment

Figure 13:
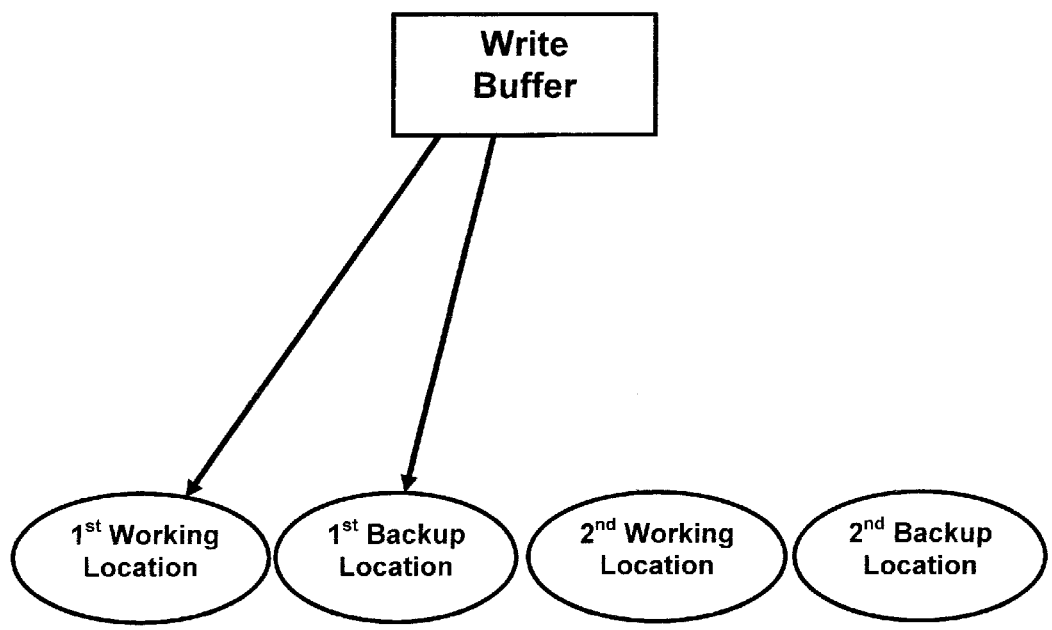
FIG. 13 depicts data being written to a first working location and a spare copy of the data being written to a first backup location according to an embodiment.

In an embodiment, shown in FIG. 13, two sets of locations instead of one set of locations can be used to write data to the disk surface 4. The first set of locations includes the first working location and the first backup location, while the second set of locations includes the second working location and the second backup location. Thus, the control circuitry 32 can alternate writing the data and the spare copy of the data between the first set of locations and the second set of locations.

Figure 14:
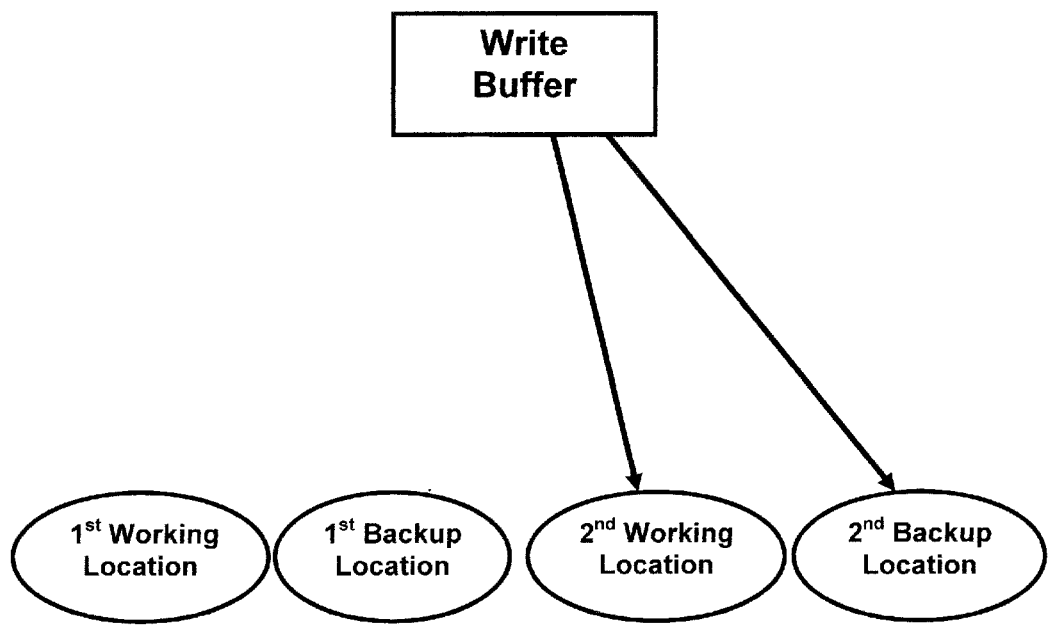
FIG. 14 depicts data being written to a second working location and a spare copy of the data being written to a second backup location according to an embodiment.

As shown in FIG. 13 when the running number is an odd number, the control circuitry 32 writes the data and the spare copy of the data to the first set of locations. That is, the control circuitry 32 writes the data to the first working location and the spare copy of the data to the first backup location. As shown in an embodiment in FIG. 14, when the running number is an even number, the control circuitry 32 writes the data and the spare copy of the data to the second set of locations. That is, the control circuitry 32 writes the data to the second working location and the spare copy of the data to the second backup location.

In an embodiment, the writing of the spare copies of the data to the first set of locations and the second set of locations can also be flipped. In such a case, the control circuitry 32 writes the data and the spare copy of the data to the first set of locations when the running number is an even number, and writes the data and the spare copy of the data to the second set of locations when the running number is an odd number.

Figure 15:
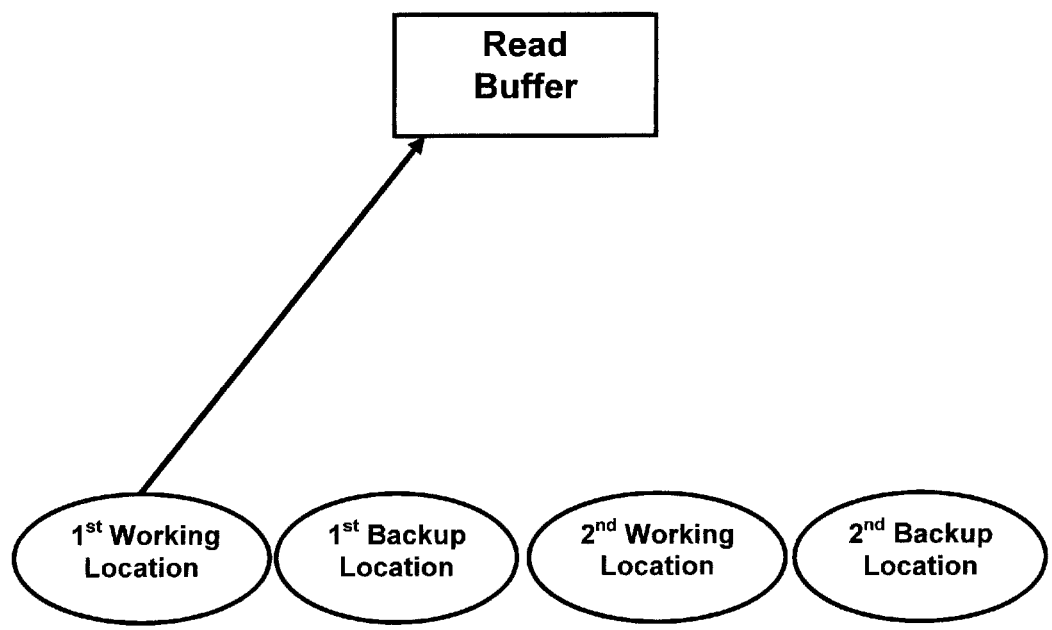
FIG. 15 depicts a verify operation of data written in a first working location according to an embodiment.
Figure 16:
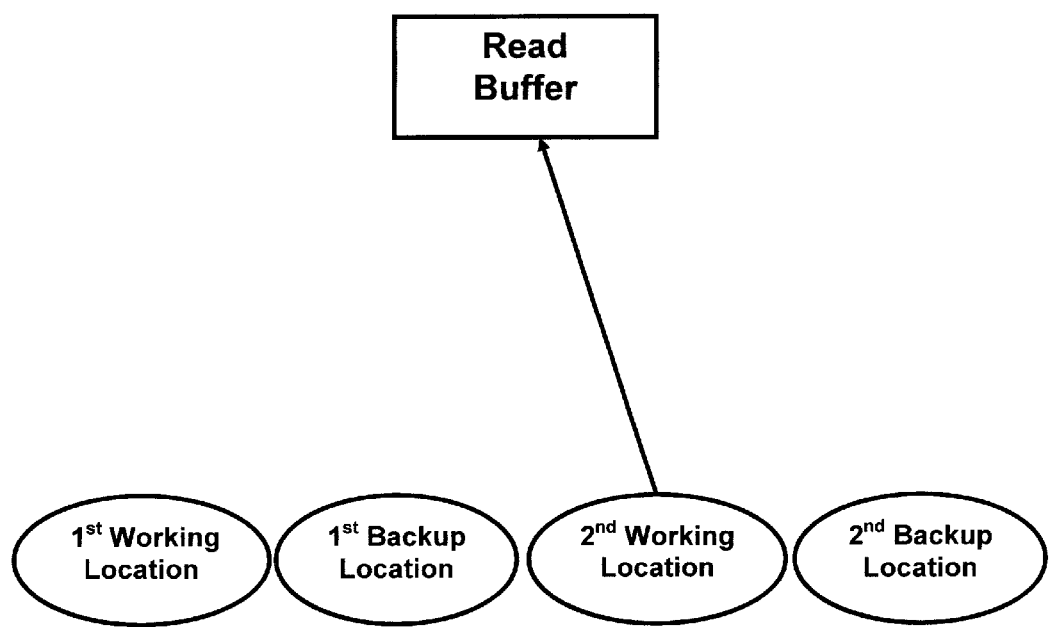
FIG. 16 depicts a verify operation of data written in a second working location according to an embodiment.

In an embodiment, as shown in FIG. 15, after data is written to the first working location, the control circuitry 32 verifies the written data through a read operation to the read buffer. If, the data is verified as being correct, then the control circuitry 32 increments the running number by 1. Similarly, in an embodiment, as shown in FIG. 16, after data is written to the second working location, the control circuitry 32 verifies the written data through a read operation to the read buffer. If, the data is verified as being correct, then the control circuitry 32 increments the running number by 1.

In an embodiment, if the control circuitry 32 is unable to verify the data stored in the first working location as being correct when the running number is an odd number, or the data stored in the second working location as being correct when the running number is an even number, the control circuitry 32 will not increment the running number. This effectively halts the alternate writing of the data and the spare copies of the data to the first set of locations and the second set of locations until the data in the first working location or the data in the second working location can be verified. Since the data and the spare copies of the data are no longer being alternately written to two different locations, only a single set of locations will be used for the storage of the data and the spare copies of the data until the data in the first working location or the data in the second working location is verified. This ensures that at least one set of locations will contain a valid, non-corrupt, or error-free data.

As the running number is incremented, the running number alternates between an odd number and an even number. Since the running number alternates between an odd number and an even number, the control circuitry 32 alternates writing the data and spare copies of the data to the first set of locations and the second set of locations as shown in an embodiment in FIG. 17.

FIG. 17 depicts a running number table including the running number, the running number of the data stored in the working location, the running number of the spare copy of the data stored in the first backup location, and the running number of the spare copy of the data stored in the second backup location. As seen in FIG. 17, the control circuitry 32 increments the running number until the running number reaches a predetermined maximum running number. Once the predetermined maximum running number is reached, the control circuitry 32 resets the running number. Although the predetermined maximum running number in FIG. 17 is 1000, the predetermined maximum running number can be set to any number sufficiently large enough to allow the control circuitry 32 to accurately determine where the most recent spare copy of the data is written or should be written.

In an embodiment, as shown in FIG. 18, an electronic file management table is stored in a memory in the disk drive 100. For example, the electronic file management table may be stored in the SM 38. Optionally, the electronic file management table may also be stored on the disk surface 4. In an embodiment, the electronic file management table can be used by the control circuitry 32 for recovery of the files being tracked. As shown in FIG. 18, the Mark_Bad_Bit section in the electronic file management table indicates, for the individual file being tracked, whether the data stored in the first working location, the spare copy of the data stored in the first backup section, the data stored in the second working location, or the spare copy of the data stored in the second backup section contains errors.

Figure 20:
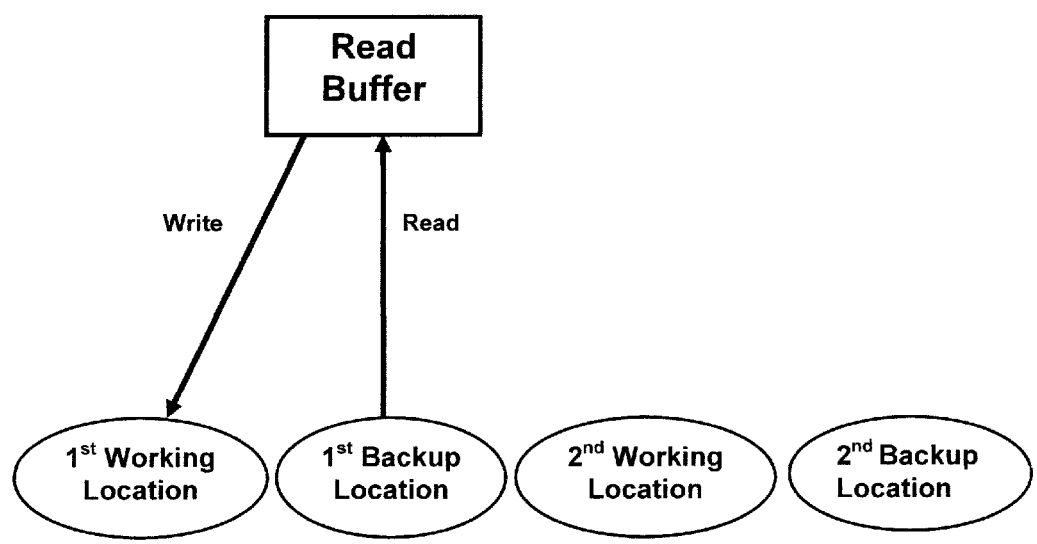
FIG. 20 depicts a replacement of data in a first working location with a spare copy of the data in a first backup location according to an embodiment.

For example, in an embodiment shown in FIG. 19, the file 0x03 can have a running number "7." Since "7" is an odd number, the control circuitry 32 will store a spare copy of the data in the first backup location. Furthermore, as seen in the Mark_Bad_Bit section, the data stored in the working location has a "1" in its column, indicating that the data stored in the working location contains errors. Thus, as seen in an embodiment shown in FIG. 20, the control circuitry 32 attempts to read the spare copy of the data stored in the first backup location and overwrite the corrupt data stored in the working location. Therefore, the data stored in the first working location is replaced by the spare copy of the data from the first backup location since the running number is an odd number. In an embodiment, an additional verification can be performed on the data stored in the first working location, after it has been replaced by the spare copy of the data from the first backup location.

However, if the spare copy of the data stored in the first backup location is corrupt, or the data stored in the first working location still contains errors even though the data stored in the first working location was overwritten by the spare copy of the data stored in the first backup location, the control circuitry 32 can utilize the data stored in the second working location or the spare copy of the data stored in the second backup location. Thus, the control circuitry 32 will replace the data stored in the first working location with data stored in the second working location or the spare copy of the data stored in the second backup location.

Figure 21:
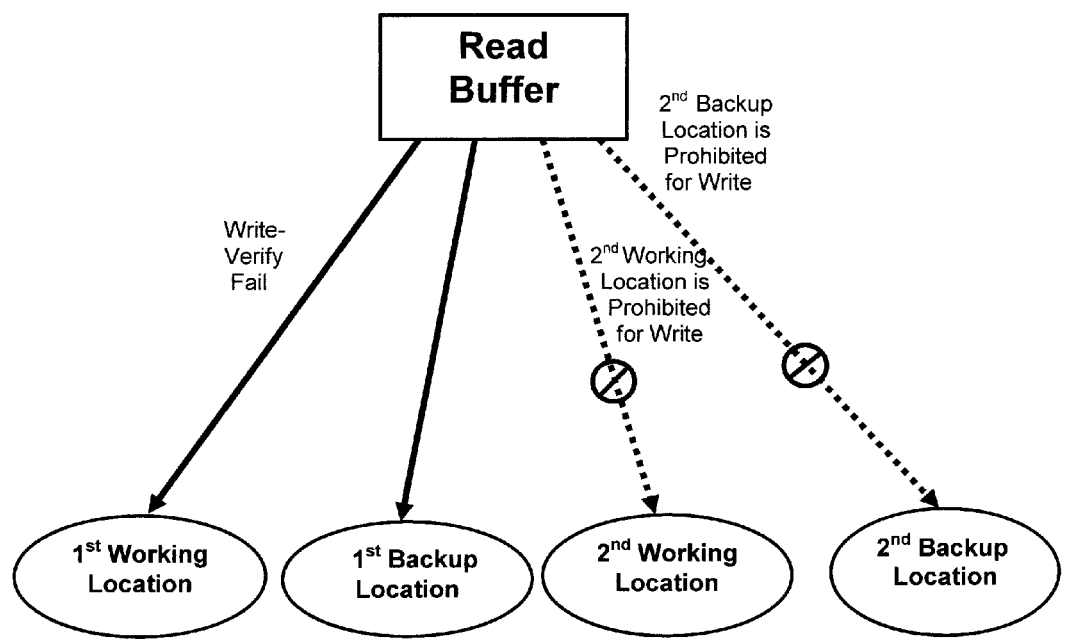
FIG. 21 depicts a second working location and a second backup location being set to a read-only status according to an embodiment.

In an embodiment shown in FIG. 21, the control circuitry 32 sets the second set of locations to a read only status when the running number is an odd number, and the data stored in the first working location or the spare copy of the data stored in the first backup location contains errors. The second working location and the second backup location are thus prohibited from being written as shown by the dotted line in FIG. 21. This prevents the second set of locations from being overwritten by corrupt data before the data in the first working location, which has been replaced by the spare copy of the data from the first backup location, is verified. In an embodiment, the running number does not need to be odd in order for the control circuitry 32 to set the first set of locations to a read only status. Instead, the control circuitry 32 need only determine that the data stored in the first working location or the spare copy of the data stored in the first working location contains errors. In an embodiment, this can ensure that there is at least one valid, non-corrupt, or error-free version of the data.

Similarly, the control circuitry 32 sets the first set of locations to a read only status when the running number is an even number and the data stored in the second working location or the spare copy of the data stored in the second working location contains errors. In an embodiment, the running number does not need to be even in order for the control circuitry 32 to set the first set of locations to a read only status. Instead, the control circuitry 32 need only determine that the data stored in the second working location or the spare copy of the data stored in the second working location contains errors.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A disk drive comprising:
   a disk surface comprising a first backup location, and a second backup location;
   a head actuated radially over the disk surface to write data to the disk surface;
   a memory configured to store a signature, wherein the signature comprises a running number; and
   control circuitry coupled to the head, the control circuitry configured to:
      receive a command to write data to the disk surface;
      insert the signature into the data;
      write the data to the disk surface;
      alternately write a spare copy of the data to the first backup location and to the second backup location based on a value of the signature; and
      write the spare copy of the data to the first backup location when the running number is an odd number, and write the spare copy of the data to the second backup location when the running number is an even number.

2. The disk drive of claim 1 wherein the memory is further configured to store an electronic file management table.

3. The disk drive of claim 2 wherein the electronic file management table stores an indication of the running number corresponding to the data, and an indication of whether the data written to the disk surface, or the spare copies of the data written to the first backup location or the second backup location, contains errors.

4. The disk drive of claim 1 wherein the control circuitry is further configured to increment the running number when the data is successfully written to the disk surface.

5. The disk drive of claim 1 wherein the control circuitry is further configured to:
   determine whether the data written to the disk surface, or the spare copy of the data written to the first backup location or the second backup location contains errors;
   set the second backup location to a read-only status when the running number is an odd number and the data written to the disk surface or the spare copy of the data written to the first backup location contains errors; and
   set the first backup location to a read-only status when the running number is an even number and the data written to the disk surface or the spare copy of the data written to the second backup location contains errors.

6. The disk drive of claim 5 wherein the control circuitry is further configured to:
   replace the data written to the disk surface with the spare copy of the data written to the first backup when the spare copy of the data written to the second backup location contains an error; and
   replace the data written to the disk surface with the spare copy of the data written to the second backup location when the spare copy of the data written to the first backup location contains an error.

7. The disk drive of claim 1 wherein the disk surface further comprises a first working location and a second working location, and wherein the control circuitry is further configured to write the data to the first working location when the running number is an odd number, and write the data to the second working location when the running number is an even number.

8. The disk drive of claim 7 wherein the control circuitry is further configured to:
   determine whether the data written to the first working location or the second working location, or the spare copy of the data written to the first backup location or the second backup location contains errors;
   set the second working location and the second backup location to a read-only status when the running number is an odd number, and the data written to the first working location or the spare copy of the data written to the first backup location contains errors; and
   set the first working location and the first backup location to a read-only status when the running number is an even number, and the data written to the second working location or the spare copy of the data written to the second backup location contains errors.

9. A method for backing up data in a data storage device comprising a disk surface comprising a first backup location, and a second backup location, a head actuated radially over the disk surface to write data to the disk surface, a memory configured to store a signature, wherein the signature comprises a running number, and control circuitry coupled to the head, the method comprising:
   receiving a command to write data to the disk surface;
   inserting the signature into the data;
   writing the data to the disk surface;
   alternately writing a spare copy of the data to the first backup location and to the second backup location based on a value of the signature; and
   writing the spare copy of the data to the first backup location when the running number is an odd number, and writing the spare copy of the data to the second backup location when the running number is an even number.

10. The method of claim 9 further comprising storing an electronic file management table in the memory.

11. The method of claim 10 further comprising storing in the electronic file management table an indication of the running number corresponding to the data, and an indication of whether the data written to the disk surface, or the spare copies of the data written to the first backup location or the second backup location, contains errors.

12. The method of claim 9 further comprising incrementing the running number when the data is successfully written to the disk surface.

13. The method of claim 9 further comprising:
   determining whether the data written to the disk surface, or the spare copies of the data written to the first backup location or the second backup location contains errors;
   setting the second backup location to a read-only status when the running number is an odd number and the data written to the disk surface or the spare copy of the data written to the first backup location contains errors; and
   setting the first backup location to a read-only status when the running number is an even number and the data written to the disk surface or the spare copy of the data written to the second backup location contains errors.

14. The method of claim 13 further comprising:
replacing the data written to the disk surface with the spare copy of the data written to the first backup when the spare copy of the data written to the second backup location contains an error; and
replacing the data written to the disk surface with the spare copy of the data written to the second backup location when the spare copy of the data written to the first backup location contains an error.

15. The method of claim 9 wherein the disk surface further comprises a first working location and a second working location.

16. The method of claim 15 further comprising writing the data to the first working location when the running number is an odd number, and writing the data to the second working location when the running number is an even number.

17. The method of claim 16 further comprising:
determining whether the data written to the first working location or the second working location, or the spare copy of the data written to the first backup location or the second backup location contains errors;
setting the second working location and the second backup location to a read-only status when the running number is an odd number, and the data written to the first working location or the spare copy of the data written to the first backup location contains errors; and
setting the first working location and the first backup location to a read-only status when the running number is an even number, and the data written to the second working location or the spare copy of the data written to the second backup location contains errors.

* * * * *